United States Patent [19]

Bergmann

[11] Patent Number: 4,522,231
[45] Date of Patent: Jun. 11, 1985

[54] SANITARY WATER VALVE

[75] Inventor: Konrad Bergmann, Wittlich, Fed. Rep. of Germany

[73] Assignee: American Standard Inc., New York, N.Y.

[21] Appl. No.: 623,641

[22] Filed: Jun. 22, 1984

Related U.S. Application Data

[63] Continuation-in-part of Ser. No. 509,126, Jun. 30, 1983, abandoned.

[30] Foreign Application Priority Data

Jul. 3, 1982 [DE] Fed. Rep. of Germany ....... 3224991

[51] Int. Cl.³ .................... F16K 11/02; F16K 19/00
[52] U.S. Cl. .................... 137/625.17; 137/625.41; 137/625.48
[58] Field of Search ........... 137/625.17, 625.4, 625.41, 137/625.48

[56] References Cited

U.S. PATENT DOCUMENTS

| | | | |
|---|---|---|---|
| 2,420,785 | 5/1947 | Lorraine | 251/96 |
| 2,566,071 | 8/1951 | Schobert | 251/96 |
| 2,646,960 | 7/1953 | Ericson | 251/102 |
| 2,666,616 | 1/1954 | Ericson | 251/96 |
| 3,103,231 | 9/1963 | Moen | 137/454.2 |
| 3,358,714 | 12/1967 | Moen | 137/625.17 |
| 3,554,232 | 1/1971 | Kappel | 137/625.17 |
| 3,592,229 | 7/1971 | Moen | 137/625.17 |
| 3,835,887 | 9/1974 | Mongerson et al. | 137/625.17 |
| 4,183,376 | 1/1980 | Moen | 137/625.17 |
| 4,263,940 | 4/1981 | Redman | 137/625.17 |

FOREIGN PATENT DOCUMENTS

| | | |
|---|---|---|
| 896438 | 10/1956 | Fed. Rep. of Germany . |
| 1103097 | 10/1961 | Fed. Rep. of Germany . |
| 2904555 | 8/1979 | Fed. Rep. of Germany ........... 137/625.17 |
| 2945834 | 11/1980 | Fed. Rep. of Germany . |

Primary Examiner—Alan Cohan
Assistant Examiner—John A. Rivell
Attorney, Agent, or Firm—James J. Salerno, Jr.; Robert G. Crooks; John P. Sinnott

[57] ABSTRACT

This invention concerns a sanitary water valve having a valve assembly, which includes a cylinder having a bore extending longitudinally therethrough and at least one water inlet orifice and a water outlet orifice formed in the cylinder wall; and a slot or opening, extending longitudinally over the length of the cylinder wall. The at least one water inlet orifice and water outlet orifice are formed on the cylinder and positioned the same longitudinal distance from one end thereof. A piston is positioned in the cylinder bore and is rotatably and longitudinally shiftable therein, the piston including a water mixing chamber in the form of a transverse slot or water passage, which is arranged and constructed to connect with at least one water inlet orifice and the water outlet orifice.

31 Claims, 17 Drawing Figures

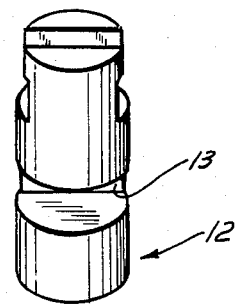
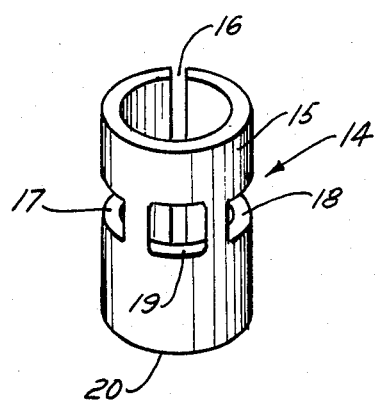
FIG. 8
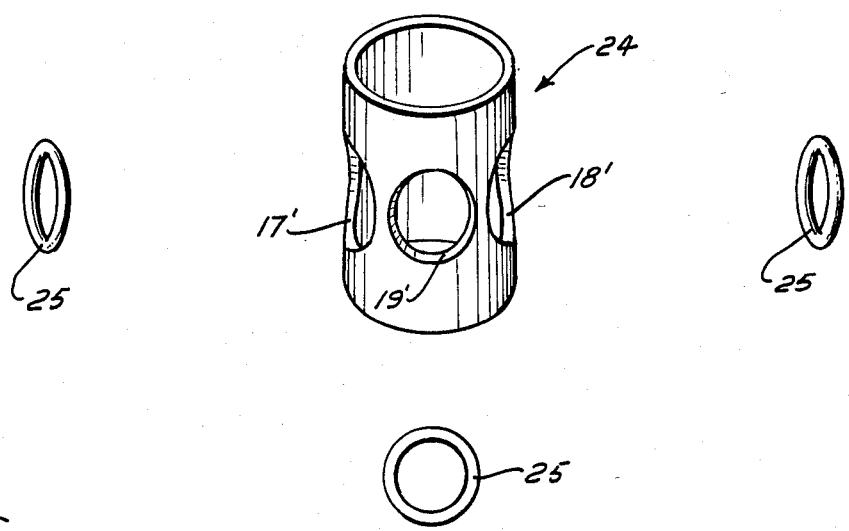

SANITARY WATER VALVE

CROSS REFERENCE TO RELATED APPLICATION

This is a continuation-in-part of application Ser. No. 06/509,126, filed 06/30/83 now abandoned.

FIELD OF THE INVENTION

The invention relates to a sanitary water valve which includes a stationary cylinder, having at least one water inlet orifice, and one water outlet orifice, a piston rotatably and longitudinally shiftably positioned in the cylinder, by which the piston may be shifted from an "off" position to a totally or partially "on" position.

BRIEF DESCRIPTION OF THE PRIOR ART

Valves of this type are known and are generally referred to as so-called single lever or single knob mixing valves. With these single control valves, the inlet orifices in the cylinder have to be sealed both against the inlet opening of the valve body and against the wall of the piston. Also, the top and bottom of the piston, as well as the outer surfaces of the cylinder, require seals to provide a fluid tight fit of the valving elements for the valve. Accordingly, valves of this type require at least four dynamic stressed seals or packings because no direct sealing takes place between the cylinder and the piston since the materials used for making the valve control elements do not provide mechanical seals at their mating surfaces. Even with control elements made of hard materials, effective mechanical seals are not possible, or only at very high manufacturing costs in order to maintain the critical tolerance required for making mating surfaces capable of forming a seal. The same problem is encountered where plastic materials are used to make the control elements, which require maintaining surfaces having critical tolerances. However, valves made of plastics of the above-described kind are difficult to manufacture.

It would be desirable to provide valves, where the control elements seal directly against each other, and the dynamic stressed seals, which are made of soft materials, could be eliminated which in turn reduces the manufacturing costs and increases the reliability in service. Mixing valves are known, which do not require dynamic stressed seals made of soft materials, since the control elements themselves provide the sealing functions. Such mixing valves of this type are provided with disc-shaped control elements made of metal or ceramics. Discs having the required surface area and tolerance which form a seal by simply placing one against the other present no difficulty in manufacture.

A disadvantage of mixing valves, having disc-shaped control elements, is to provide a water temperature comfort zone, which approximates that of piston valves, and requires increased manufacturing costs. As used herein, the temperature comfort zone means that in the mixed water temperature, the user obtains only a relatively small change of temperature by an increased or decreased movement of the lever or the knob. Another disadvantage of water valves, having disc-shaped control elements, is that the movable disc and the necessary flow sections formed therein require relatively enlarged disc-areas, which results in a corresponding increase in the diameter of the valve. Also, another disadvantage of such a mixing valve is that the actuating means for the movable disc is more expensive to manufacture because of the critical tolerances and quality of the material used for the actuating means that is necessary to withstand the relatively great forces that the respective parts are subjected to.

SUMMARY OF THE INVENTION

In accordance with the present invention, the seal problems and disadvantages encountered with regard to the manufacture and use of single-control valves have been overcome by providing valves of this type that are simple in construction, inexpensive to manufacture, and reliable in operation.

These objectives advantageously have been achieved by providing such valves with valving elements in the form of a cylinder, having a continuous, lengthwise slot formed through the cylinder wall over its entire length. The longitudinal, lengthwise slot formed in cylinder permits the use of a piston that has a diameter which is slightly oversized, with respect to the diameter of the cylinder. When the piston is inserted into the cylinder, the lengthwise slot permits the cylinder to expand due to the elasticity of the material forming the cylinder which provides positive, fluid tight, mechanical seal due to the compressive radial forces exerted on the piston by the cylinder. Pistons and cylinders manufactured in this manner may be made having a greater range of tolerance limits. The problems encountered in their production may be controlled so that after mating the piston with the cylinder, the tolerance limits between the sealing surfaces required for producing each piece is less than the resulting gap in the cylinder. Additional radial, compressive forces are exerted by the cylinder toward the piston by the added pre-tension of the O-rings which seal the inlet orifices and outlet orifice of the cylinder against the corresponding valve body orifices.

Another object of the invention is to provide cylinder wall which increases thickness starting from the longitudinal slot to a maximum wall thickness in the section of the cylinder diametrically opposite the slot. This is technically achieved by an eccentrically disposed cylinder bore which is offset from the center axis of the cylinder, and as such the tolerance limits thereof may be quite large.

In accordance with another object of the invention, a single-control sanitary water valve is provided having both inlet orifices for cold and warm water and the outlet orifice for the mixed water formed in the cylinder wall, the same longitudinal distance from end thereof. Cylinders formed, having the inlets and outlet at the same longitudinal distance from its end permits the length of both the piston and cylinder to be decreased when compared to presently manufactured piston type mixing valves that have the outlet orifice positioned in the cyliner above or below than the inlet orifices.

In accordance with still another object of the invention, to provide a cylinder having a longitudinal slot extending between the inlet orifices and an outlet orifice disposed on the part of the cylinder wall opposite the longitudinal slot. This arrangement permits the use of a piston of the type having a chamber in the shape of a transversely formed groove or channel to connect the inlet orifices with the outlet orifice, which design is relatively simple to manufacture.

A further object of the invention is to provide a piston in the shape of a pipe-body, having a transversely formed orifice or channel to connect the inlet orifices with the outlet orifice of the cylinder.

Accordingly, a still further object of the invention is to provide a cylinder having inlet orifices, each inlet orifice having a greater length in its horizontal dimension than the horizontal dimension of the outlet orifice. The volume of water flow for providing the desired comfort zone temperatures is obtained by increasing the height of the outlet orifice.

According to still another object of the invention, the O-ring packings are seated at the inlet openings and outlet openings on the outer surface of the cylinder by providing on the outer surface thereof, longitudinal ribs extending between the outlet orifice and two inlet orifices, together with a longitudinal rib on both sides of the longitudinal slot.

According to still a further object of the invention, is to provide a counter bearing in the form of a sleeve or shell, having a longitudinal slot, inlet and outlet openings corresponding to the inlet and outlet openings formed in the cylinder through which O-ring packings are supported.

IN THE DRAWINGS

FIG. 8 is an exploded, isometric view of the valve assembly, illustrated in FIGS. 1-7;

DETAILED DESCRIPTION OF THE PREFERRED EMBODIMENTS

Figure 5:
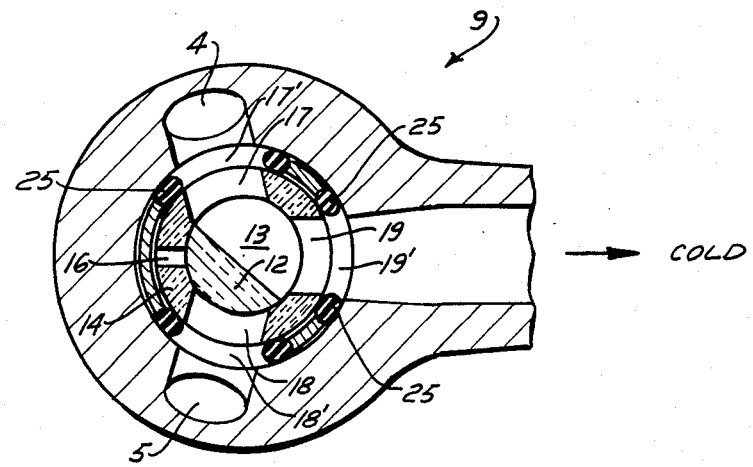
FIGS. 5-7 are horizontal, cross-sectional views of the sanitary water valve of FIGS. 3 and 4, showing the valve assembly of FIG. 1 positioned respectively between cold, mixed and hot water flows.
Figure 6:
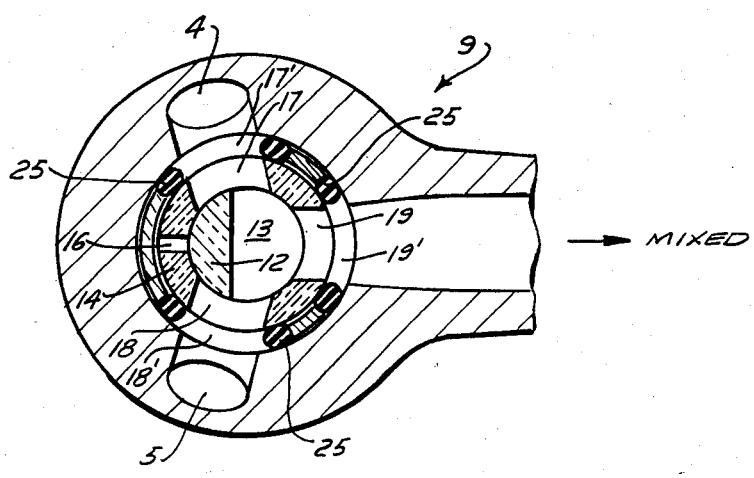
Figure 7:
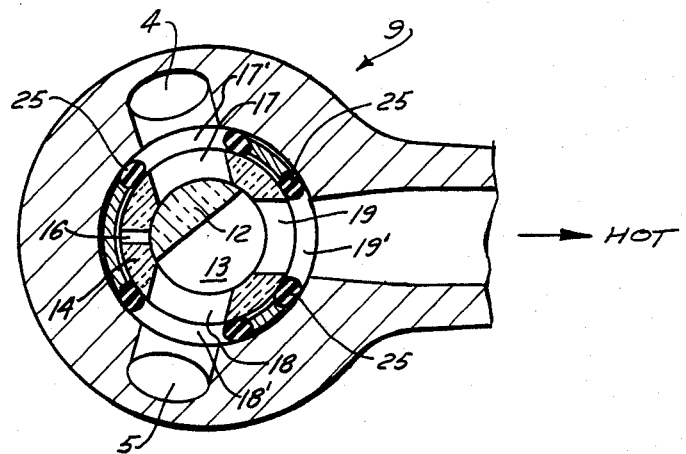
Figure 9:
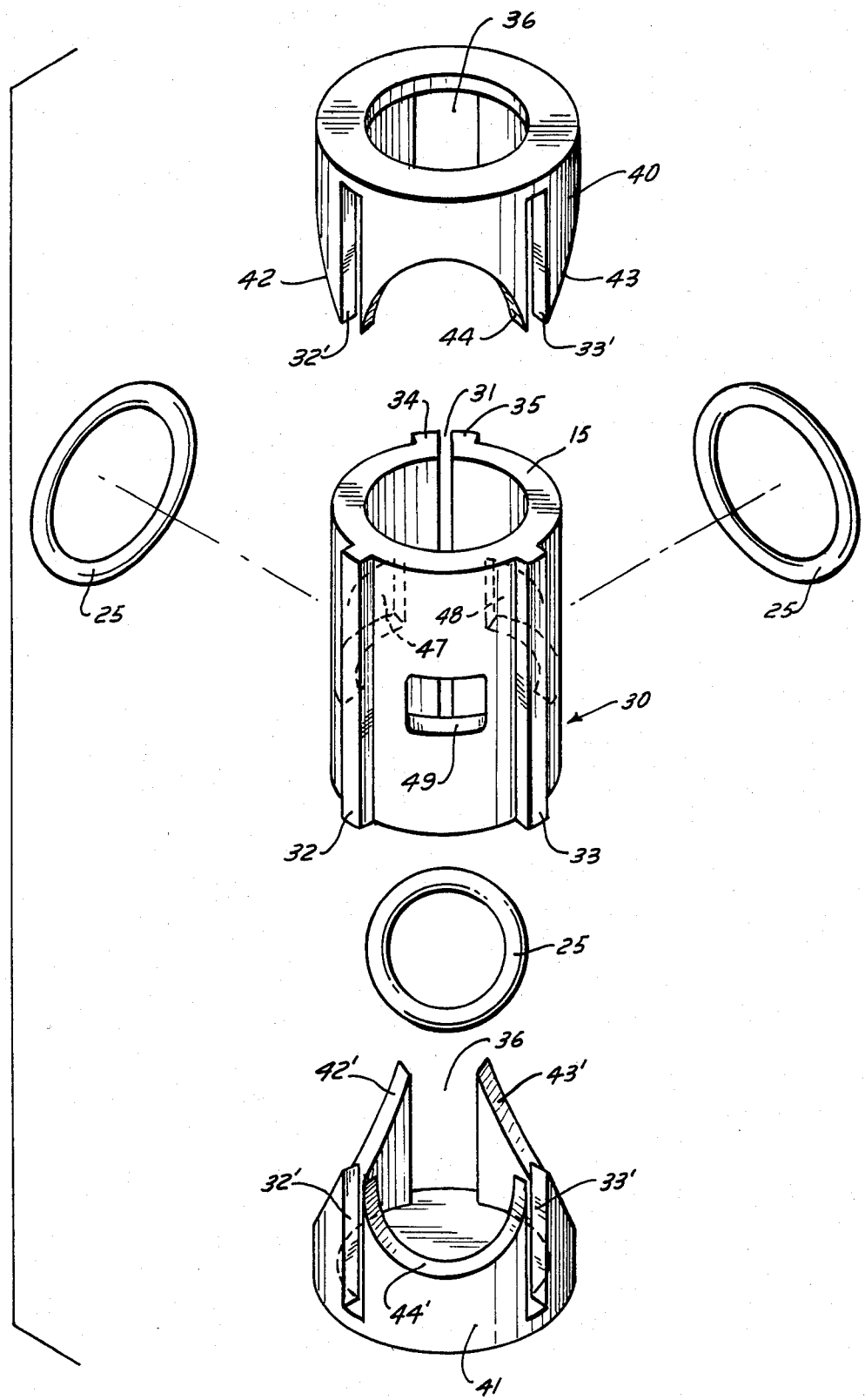
FIG. 9 is an exploded isometric view of another form of the cylinder assembly.
Figure 10:
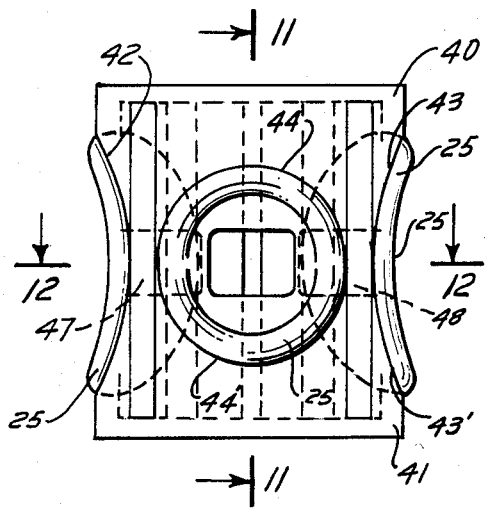
FIG. 10 is an elevational view of the cylinder of FIG. 9, fully assembled.
Figure 11:
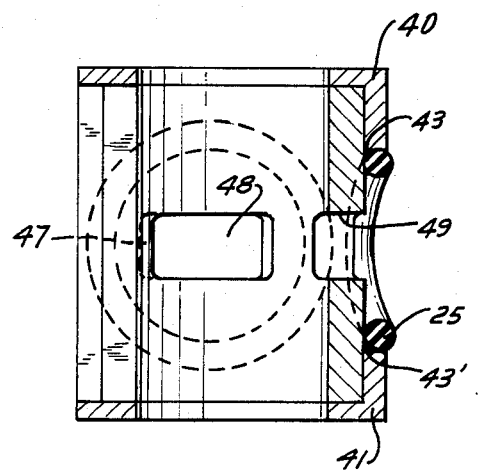
FIG. 11 is a sectional view, taken along line 11—11 of FIG. 10.
Figure 12:
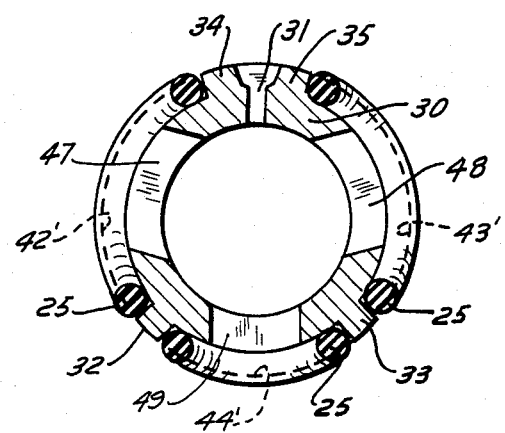
FIG. 12 is a cross-sectional view, taken along line 12—12 of FIG. 10.
Figure 14:
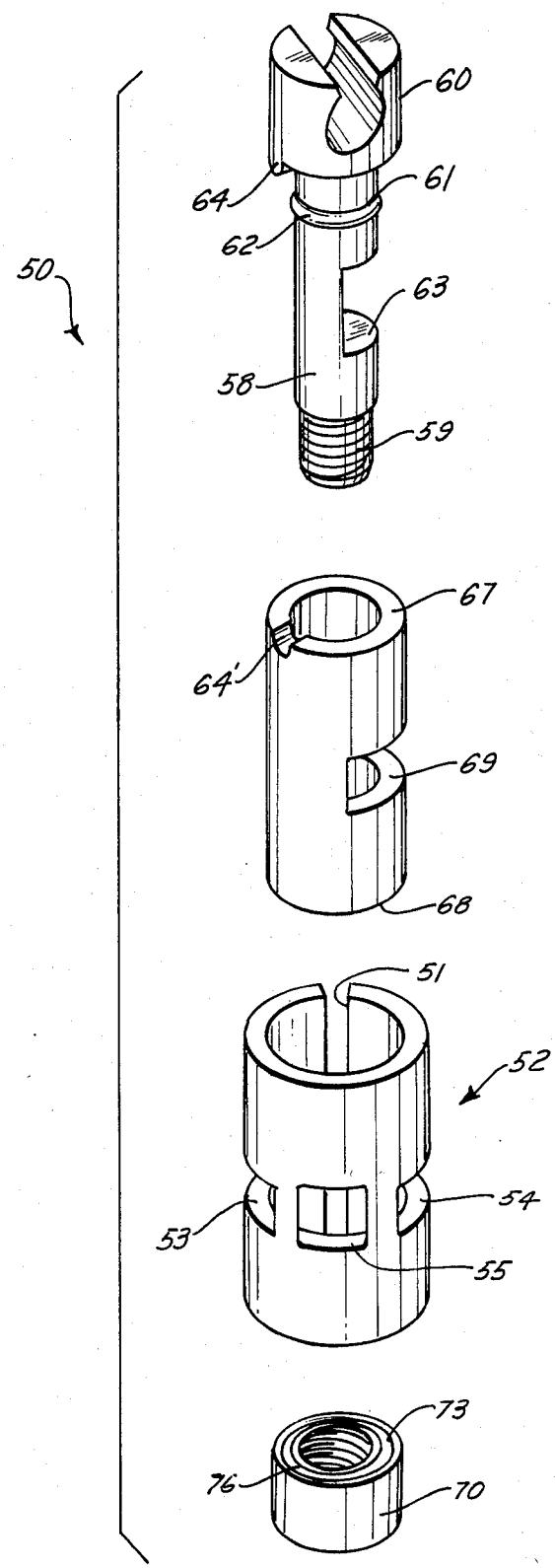
FIG. 14 is an exploded, isometric view of still another form of the valve assembly of FIG. 1.
Figure 17:
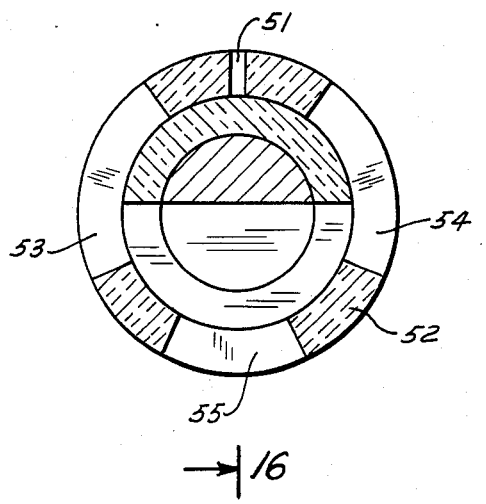
FIG. 17 is a cross-sectional view, taken along line 17—17 of FIG. 15.
Figure 15:
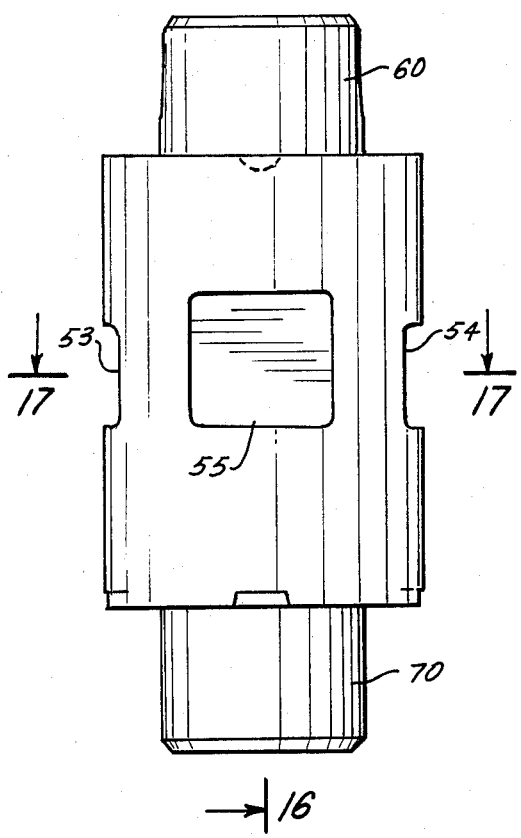
FIG. 15 is an elevational view of the valve of FIG. 14 fully assembled.
Figure 16:
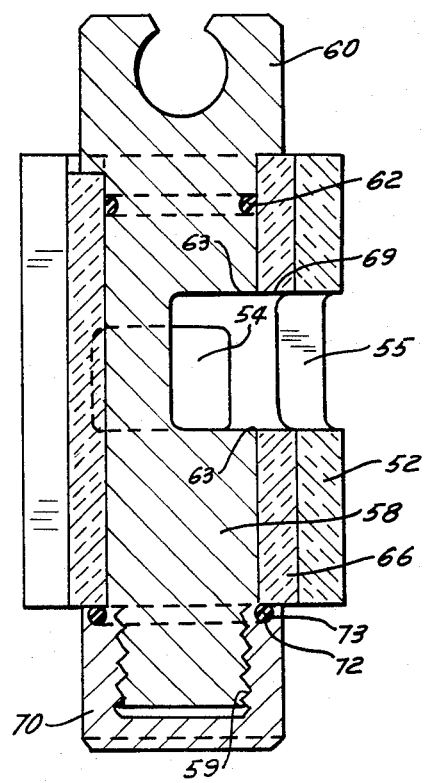
FIG. 16 is an elevational view in section, taken along line 16—16 of FIG. 15.

In the drawings, FIGS. 1-8 illustrate one form of valve assembly 10. Valve assembly 10 includes a cylinder 14 and a piston 12, which is positioned in the cylinder bore and is rotatable and longitudinally shiftable. Longitudinal slot 16, two inlet orifices 17,18 for cold and warm water, respectively, and an outlet orifice 19 for discharging mixed water therethrough are formed in cylinder 14. Longitudinal slot 16 extends along the length of cylinder 14 and is disposed between the two inlet orifices 17,18. The inlet orifice 17,18 and outlet orifice 19 are formed through cylinder wall 15 and are positioned at the same longitudinal distance from its base or lower end 20. The inlet orifices 17,18 are identically dimensioned with their horizontal dimension being greater than their longitudinal dimension. The outlet orifice 19 has a horizontal dimension less than the horizontal dimension of inlet orifices 17,18, but its longitudinal dimension is greater. The longitudinal dimension of outlet orifice 19, may vary depending upon the desired temperature comfort zone required for a particular sanitary water valve. Also forming part of the valve assembly 10 is counter-bearing or sleeve 24, preferably made of a suitable metal, is formed having inlet orifices 17', 18' and an outlet orifice 19' which are dimension to encircle inlet orifices 17,18 and outlet orifice 19, respectively, of cylinder 14 so that O-ring packings 25 can be mounted therein to effect a watertight seal between inlet orifices 17,18 and outlet orifice 19 and the corresponding water passageways in sanitary valve 9 which are shown in FIGS. 5-7. A flow chamber 13, in the form of a recess, is provided in piston 12 to connect with inlet orifices 17,18 and outlet orifice 19, as shown in FIGS. 7-8. In valve assembly 10, cylinder 14 and piston 12 are preferably made of aluminium oxide, which is capable of forming very smooth surfaces, which when mated in face-to-face contact form a watertight seal without the need of other seal assemblies. As is evident, other materials may be used such as metals or metal alloys and even certain plastics, however, such valve assemblies may require the use of static seal assemblies. In FIGS. 3-7, valve assembly 10 is shown operably mounted in sanitary fitting 9 in its closed position, FIG. 3, in its opened position, and FIG. 4 and in the various mixing modes, full cold, FIG. 5 uniformly mixed cold and hot, FIG. 6 and full hot, FIG. 7.

Another form of counter bearing and cylinder assembly is illustrated in FIGS. 9-13. Cylinder 30 is preferably made of high content aluminium oxide similar to cylinder 14 of FIGS. 1-8. Cylinder 30 differs in design wherein longitudinally extending ribs 32,33 and 34,35 are formed on its outer surface as most clearly shown in FIG. 9. Ribs 32,33 are spaced to straddle outlet orifice 49, while ribs 34,35 are formed, respectively, on each side of longitudinal slot 31. The counter bearing assembly rather than being a sleeve bearing as shown in FIGS. 1-8, are a pair of generally cup-shaped bearings 40,41. Each bearing 40,41 is identically shaped. Each are formed having slots 32',33',36, which provide guides to mount upper and lower bearings 40,41, respectively. Each bearing at its inner or open end is designed having three uniformly shaped scalloped edges formed between slots 32',33',36, and when mounted on cylinder 30, FIG. 11, scalloped edges 42,43, 44 of top bearing 40 are complimentary to scalloped edges 42', 43',44' of lower bearing 41 to form circular recesses for housing O-ring packings 25 which encircle inlet orifices 47,48 and outlet orifice 49 and when the valve assembly is operably mounted in sanitary fitting 9 provides watertight seal connections between the hot and cold water inlets and outlet of the valve body and the respective orifices of cylinder 30. While FIGS. 9-13 only illustrate the cylinder and bearing assembly, the piston shown in FIGS. 1-8 is used and is made of the same material and is similarly shaped and is positioned in the bore of cylinder 30. Also, the wall 15 of cylinder 30 increases in thickness starting from longitudinal slot 31 to its maximum wall thickness in the section of cylinder wall which is diametrically opposite the slot, as is most clearly shown in FIG. 13. Bearings 24, and 40,41 also provided additional strength to cylinder 14,30, particularly in its radial direction.

The embodiment illustrated in FIGS. 14-17 utilizes an alternate form of piston 12, shown in FIGS. 1-7. Valve assembly 50 includes a cylinder having inlet orifices 53,54 and outlet orifice 55 and the wall of the cylinder is formed having an increase in thickness starting from slot 51 to a maximum wall thickness in the section of cylinder wall opposite the longitudinal slot 51. Cylinder 52 is preferably made of high content aluminium oxide and has the same physical properties of cylinders 14,30. Piston assembly 56 includes a shaft 58 which is threaded at its lower end 59 and at its upper end is an enlarged head 60 constructed to operatively couple linkages to a handle or lever, shown in FIGS. 3,4. A circumferential groove 61 is formed around shaft 58 which seats O-ring 62. A channel or groove 63 is formed in shaft 58 and is adapted to communicate with inlet orifices 53,54 and outlet orifice 55 formed in cylinder 52. A sleeve 66, made of high content aluminium oxide is formed having an internal bore 67 having slightly greater diameter than the diameter of shaft 58 which, when mounted thereon is locked from rotation by rib 64, formed along the under surface of enlarged head 60. Rib 64 nests in corresponding slot 64' formed in the upper rim 67 of sleeve 66. O-ring 62 provides a watertight seal at the upper end 67 of sleeve 66. A threaded nut 70, having an outside diameter slightly greater than shaft 58 and less than the bore diameter of cylinder 52, threadedly engages shaft 58 and when tightened, FIG. 16, locks sleeve 66 onto shaft 58. This permits piston assembly 56 to be longitudinally shiftable and rotatable within the cylinder bore of cylinder 52. An annular groove 72 if formed around the upper surface 76 of nut 70 which seats O-ring 73 and provides watertight seal at the lower end 68 of sleeve 66. Sleeve 66 is formed having a slot 69, which is aligned with groove 63 of shaft 58, so that a water passageway is formed which communicates with the water inlet orifices 53,54 and water outlet orifice 55 of cylinder 52.

Figure 1:
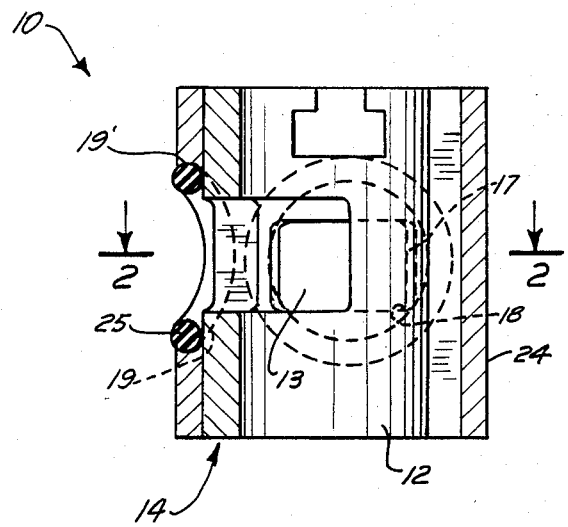
FIG. 1 is a view in elevation, partially in section, illustrating one form of the valve assembly of the present invention.
Figure 2:
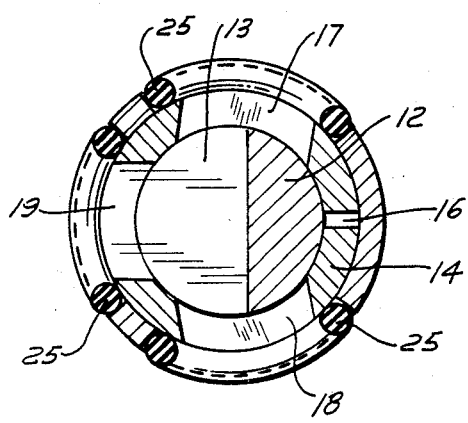
FIG. 2 is a sectional view taken along line 2—2 of FIG. 1.
Figure 13:
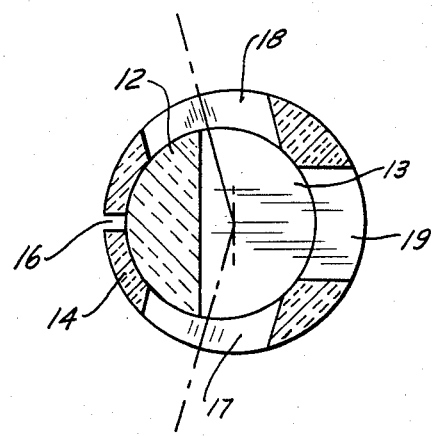
FIG. 13 is a cross-sectional view of the piston and cylinder in which the cylinder wall is greatly exaggerated to show its increasing thickness, formed by its eccentrically positioned bore.
Figure 3:
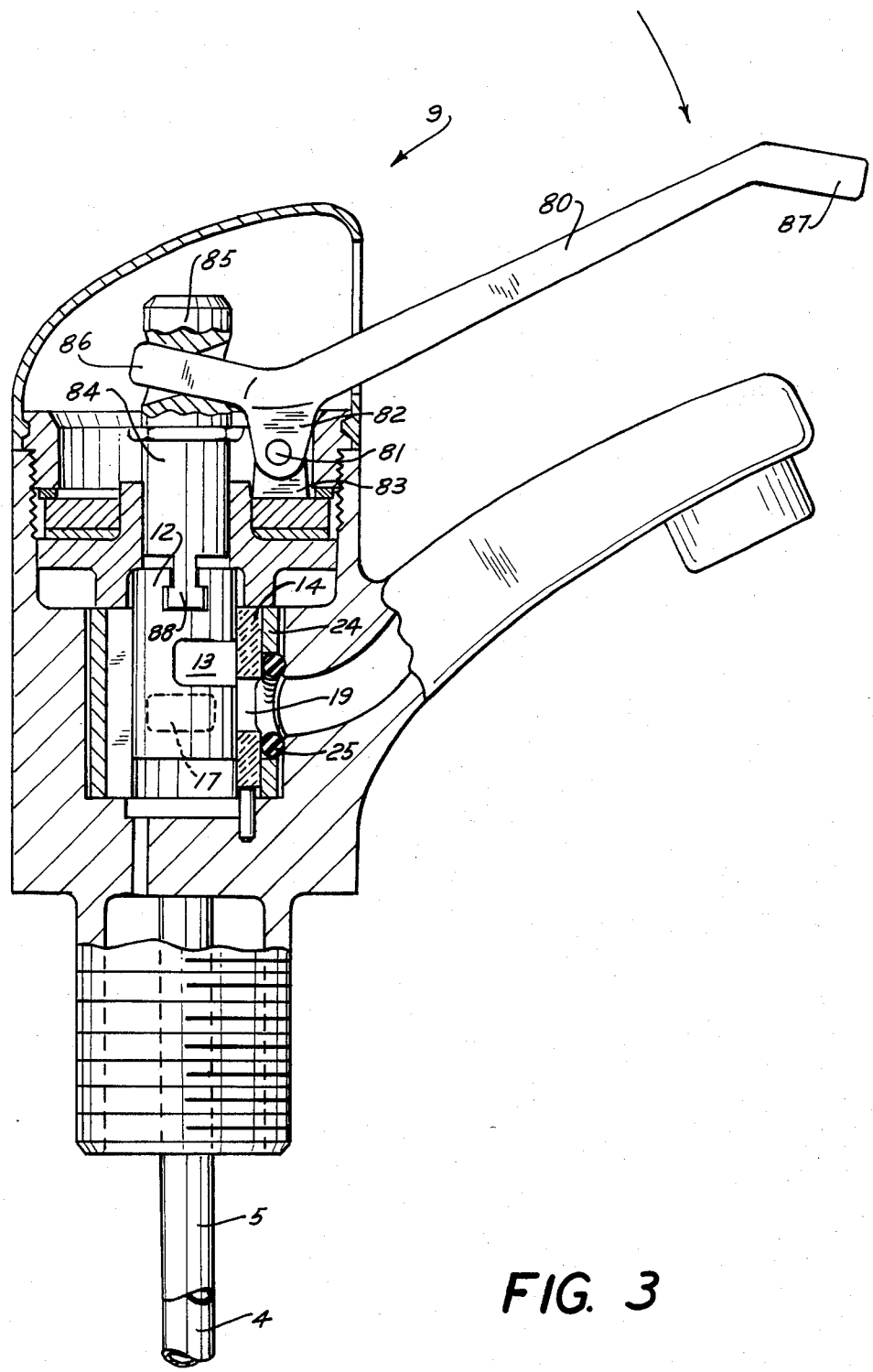
FIG. 3 is a view in elevation, partly section, showing the valving assembly of FIG. 1, operatively mounted in a sanitary fitting in close position.
Figure 4:
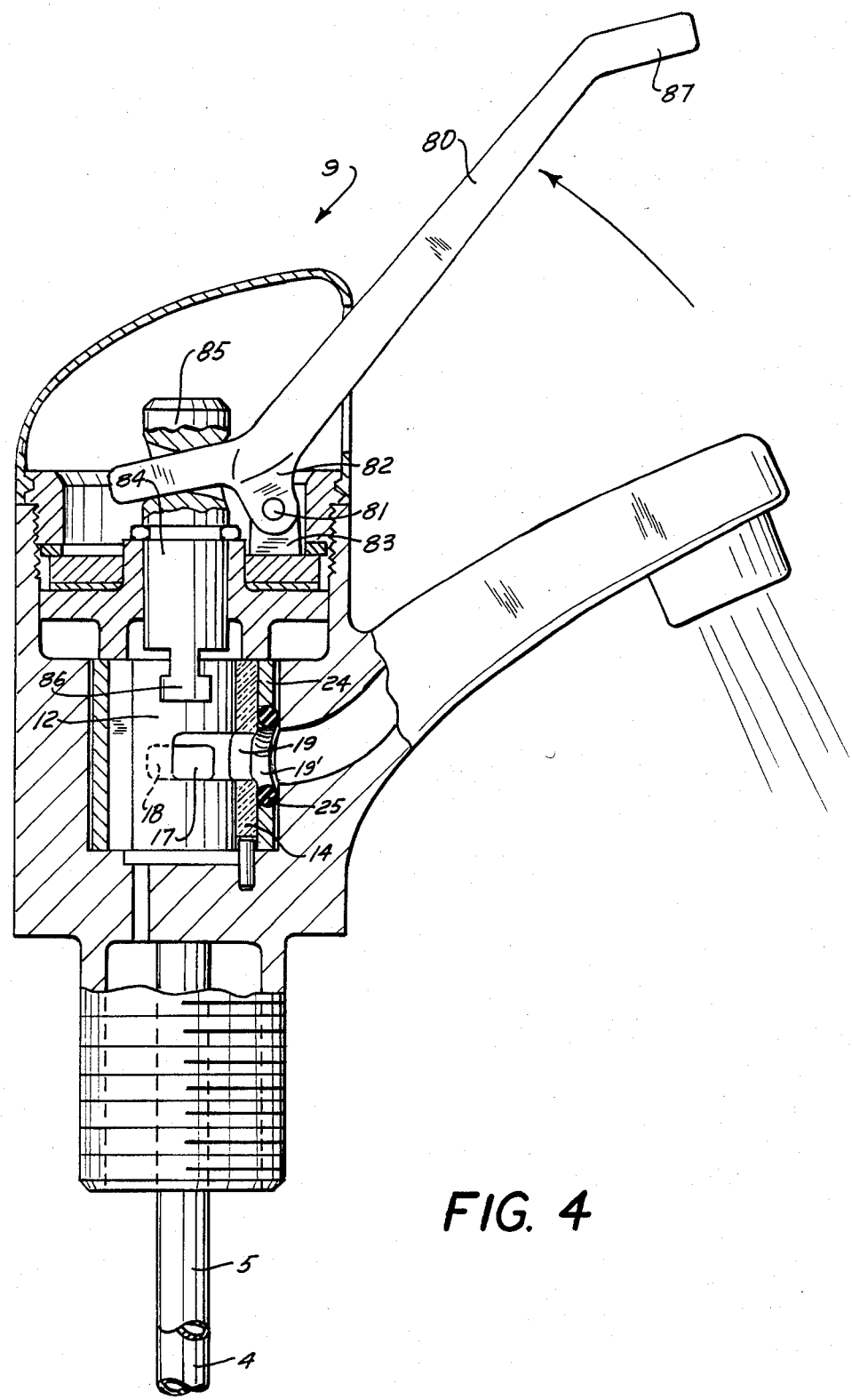
FIG. 4 is a view similar to FIG. 3, but illustrating the valve assembly of FIG. 1 in its open position.

As shown in FIG. 13, the wall of the cylinder increases in thickness starting from a slot and increases to a maximum wall thickness of the wall section opposite the slot. The increase in wall thickness forms a most effective spring or hinge effect when a slightly oversized piston is positioned in the cylinder. The cylinder expands and maintains a compressive, radial force against the piston to provide a functional sealing contact between the mating faces of the cylinder and the piston. The wall thickness of the cylinder is generally about 1.5 mm, at the slot and increases in thickness to a maximum up to about 2.5 mm along the section of the cylinder wall opposite the slot. Accordingly, the difference between the axial center line of the cylinder and the axial center line of the cylinder bore defines the eccentricity of the cylinder which is at least 1.0 mm and may be up to about 2.5 mm, which is generally necessary since under the effect of high pressures such as occurs with water hammer, damage could result if less than about 1.0 mm differential were maintained. On the other hand, exceeding this wall thickness would decrease the elasticity of the cylinder, and therefore the diameter of the piston would become more critical.

In sanitary valve designs of the present type, the various forms of the cylinder, counter bearing and piston designs function in sanitary fitting 9 in the same manner. The piston is coupled between linkage means 84 and handle or lever 80 so that the piston is both longitudinally displaceable in the cylinder bore to control water volume flow and is rotatable therein to control the mixing of water flow through hot and cold water conduits 4,5, shown in the various positions in FIGS. 3-7.

The operation of a mixing valve 9, according to the invention, corresponds to that of known piston operated valves and will be described with regard to FIGS. 1-7, although its operation is the same for all embodiments shown. The temperature and volume of water passing through the mixing valve can be adjusted by respectively rotating and raising or lowering piston 12 by operating a lever 80. A pivot pin 81 directed horizontally through a lug 82 of the lever 11 pivotally attaches the lever 11 to a bearing part 83. The pin 81 is positioned eccentrically of a valve linkage 84. The head portion 85 is coupled to free end 86 of the lever 80. The lower portion 86 of valve linkage 84 is connected to the piston 12. Thus, by an up and down action of the outer end 87 of the lever 80, piston 12 will be lowered and raised accordingly to open and close valve 10, and by swinging lever 80 horizontally about the axial line of valve piston 12, the piston will be rotated accordingly to vary the water mixture.

As previously discussed, the cylinder and piston, or a piston sleeve, are preferably made of a ceramic material, a high content aluminium oxide. The cylinder is formed from the ceramic material and after being fired, the inner surface is polished to provide a first mating surface. The piston, also made of ceramic material, is formed having a diameter slightly in excess of the diameter of the cylinder, and it too is polished to provide a second mating surface. When the piston is inserted into the cylinder, the cylinder will expand slightly due to the longitudinal slot formed through the cylinder wall so that its diameter will mate with the diameter of the piston. This provides a watertight seal between the piston and the inner surface of the cylinder. When the piston is rotated and/or shifted longitudinally water will flow through either one of the inlet openings in the cylinder wall and through the flow passage formed on the piston to the outlet opening in the cylinder wall.

The foregoing description and illustration of preferred embodiments represent various examples for practicing the invention. Variations and modifications of the invention will occur to those skilled in the art, for example, the invention could be used with dual control mixing valves or single faucet valves which control only cold and warm water. Also, the invention contemplates when positioning the two inlet orifices, the upper edge of the outlet orifice should not lie below the lower edges of the inlet orifices and respectively, that the lower edge of the outlet orifice should not lie about the upper edges of the inlet orifices.

I claim:

1. A sanitary water valve comprising a stationary cylinder having at least one water inlet orifice, a rotatable and longitudinally shiftable piston positioned in said cylinder to control the flow of water through said at least one water inlet orifice from a closed to an opened position; said cylinder having a longitudinal extending continuous lengthwise slot and said piston and cylinder having mating surfaces, which form a watertight, mechanical seal between their mating surfaces without the necessity of using static seal means.

2. A sanitary water valve comprising:
   a stationary cylinder having a longitudinal bore therethrough and having a longitudinal slot extending along the length of the cylinder wall;
   said cylinder having at least one water inlet orifice and a water outlet orifice formed in its wall;
   a rotatable and longitudinally shiftable piston positioned in said longitudinal bore and having water passage means to control the flow of water to said water outlet orifice from said at least one water inlet orifice;
   said piston having a diameter slightly greater than the diameter of the cylinder bore; and
   said piston and said cylinder having mating surfaces so that when said oversized piston is inserted into said cylinder bore, said oversized piston expands the cylinder causing compressive radial forces to be exerted against said mating surfaces of said piston and said cylinder to form a watertight, mechanical seal without the necessity of using static seal means.

3. The sanitary valve, according to claim 2, wherein the axis of the cylinder bore is offset from, but parallel to, the axis of said cylinder.

4. The sanitary water valve, according to claim 2, wherein at least the outer surface of said piston and the inner surface of said cylinder is formed of a high content aluminium oxide.

5. The sanitary water valve, according to claim 2, wherein the wall thickness of the cylinder increases beginning from the longitudinal slot and increase to a maximum wall thickness along the section of the cylinder wall diametrically opposite said slot.

6. The sanitary water valve, according to claim 2, wherein said cylinder includes cold and warm water inlet orifices and an outlet orifice, said inlet orifices and said outlet orifice being positioned on said cylinder at the same longitudinal distance with respect to one end thereof.

7. The sanitary water valve, according to claim 6, wherein each of said inlet orifices has a greater length dimension in horizontal direction than the horizontal length dimension of the outlet orifice.

8. The sanitary water valve, according to claim 2, wherein said longitudinal slot is formed between the inlet orifices and is disposed opposite said outlet orifice.

9. The sanitary water valve, according to claim 2, wherein said piston includes a transverse channel which connects said at least one inlet orifice with said outlet orifice.

10. The sanitary water valve, according to claim 9, wherein said piston is shaped in the form of a pipe body.

11. The sanitary water valve, according to claim 2, which includes O-ring packings mounted on said cylinder wall in surrounding relation to said at least one inlet orifice and said outlet orifice to provide a watertight seal between the corresponding water inlet and water discharge orifices of said valve and said cylinder.

12. The sanitary water valve, according to claim 2, wherein said cylinder includes a longitudinal extending rib formed on each side of said longitudinal extending slot and a pair of spaced apart longitudinal extending ribs, and said at least one inlet orifice is positioned between said pair of ribs.

13. The sanitary water valve, according to claim 12, includes a pair of generally cup-shaped bearings positioned, respectively, on the upper and lower ends of said cylinder, each cup-shaped bearing having complimentary, generally semicircular sections formed around the rim of its open end and each semicircular section being separated by a longitudinal extending slot, each slot corresponding to said longitudinal ribs of said cylinder.

14. The sanitary water valve, according to claim 13, wherein said complimentary semicircular sections of said upper and lower cup-shaped bearings provide seat means for mounting O-ring packings on said cylinder in surrounding relation to said at least one water inlet orifice and said outlet orifice to provide a watertight seal between said cylinder and the corresponding water inlet and outlet orifices of said sanitary valve.

15. The sanitary water valve, according to claim 2, includes a counter bearing having at least one water inlet orifice and an outlet orifice corresponding to said at least one inlet orifice and said outlet orifice of said cylinder, the surfaces defining said orifices in said counter bearing providing means for mounting O-ring packings therein to effect a watertight seal between said orifices of said cylinder and the corresponding orifices of said sanitary valve.

16. The sanitary water valve, according to claim 15, wherein said counter bearing is in the form of a metal sleeve.

17. The sanitary water valve, according to claim 2, wherein the upper horizontal edge of said outlet orifice is positioned on the cylinder wall above the upper horizontal edge of said at least one inlet orifice.

18. The sanitary water valve, according to claim 2, wherein the lower horizontal edge of said outlet orifice is positioned between lower and upper horizontal edges of said at least one inlet orifice.

19. The sanitary water valve, according to claim 3, wherein the difference between axial center lines of said cylinder and said cylinder bore is at least 1.0 mm.

20. A valve assembly adapted to be operably coupled to a sanitary water valve, said valve assembly comprising;
   a cylinder having a longitudinal bore therethrough and having a longitudinal slot extending along the length of the cylinder wall;
   said cylinder having at least one water inlet orifice and a water outlet orifice formed in its wall;
   a rotatable and longitudinally shiftable piston positioned in said longitudinal bore and having water passage means to control the flow of water to said water outlet orifice from said at least one water inlet orifice;
   said piston having a diameter slightly greater than the diameter of the cylinder bore; and
   said piston and said cylinder having mating surfaces so that when said oversized piston is inserted into said cylinder bore, said oversized piston expands the cylinder causing compressive radial forces to be exerted against said mating surfaces of said piston and said cylinder to form a watertight, mechanical seal without the necessity of using static seal means.

21. The valve assembly, according to claim 20, wherein the axis of the cylinder bore is offset from, but parallel to, the axis of said cylinder.

22. The valve assembly, according to claim 20, wherein at least the outer surface of said piston and the inner surface of said cylinder is formed of a high content aluminium oxide.

23. The valve assembly, according to claim 20, wherein the wall thickness of the cylinder increases beginning from the longitudinal slot and increases to a maximum wall thickness along the section of the cylinder wall diametrically opposite said slot.

24. The valve assembly, according to claim 20, wherein each of said at least one inlet orifice has a greater length dimension in horizontal direction than the horizontal length dimension of the outlet orifice.

25. The valve assembly, according to claim 20, wherein said cylinder includes a longitudinal extending rib formed on each side of said longitudinal extending slot and a pair of spaced apart longitudinal extending ribs, and said at least one inlet orifice is positioned between said pair of ribs.

26. The valve assembly, according to claim 25, includes a pair of generally cup-shaped bearings positioned, respectively, on the upper and lower ends of said cylinder, each cup-shaped bearing having complimentary, generally semicircular sections formed around the rim of its open end and each semicircular section being separated by a longitudinal extending slot, each slot corresponding to said longitudinal ribs of said cylinder.

27. The valve assembly, according to claim 20, includes a counter bearing having at least one water inlet orifice and an outlet orifice corresponding to said at least one inlet orifice and said outlet orifice of said cylinder, the surfaces defining said orifices in said counter bearing providing means adapted to mount O-ring packings therein to effect a watertight seal between said orifices of said cylinder and the corresponding orifices of said sanitary valve.

28. The valve assembly, according to claim 27, wherein said counter bearing is in the form of a metal sleeve.

29. The valve assembly, according to claim 20, wherein the upper horizontal edge of said outlet orifice is positioned on the cylinder wall above the upper horizontal edge of said at least one inlet orifice.

30. The valve assembly, according to claim 20, wherein the lower horizontal edge of said outlet orifice is positioned between lower and upper horizontal edges of said at least one inlet orifice.

31. The valve assembly, according to claim 21, wherein the difference between axial center lines of said cylinder and said cylinder bore is at least 1.0 mm.

* * * * *